Feb. 13, 1945     R. L. DREW     2,369,343
METHOD OF RECOVERING HAEMATOXYLIN
Filed Jan. 19, 1943
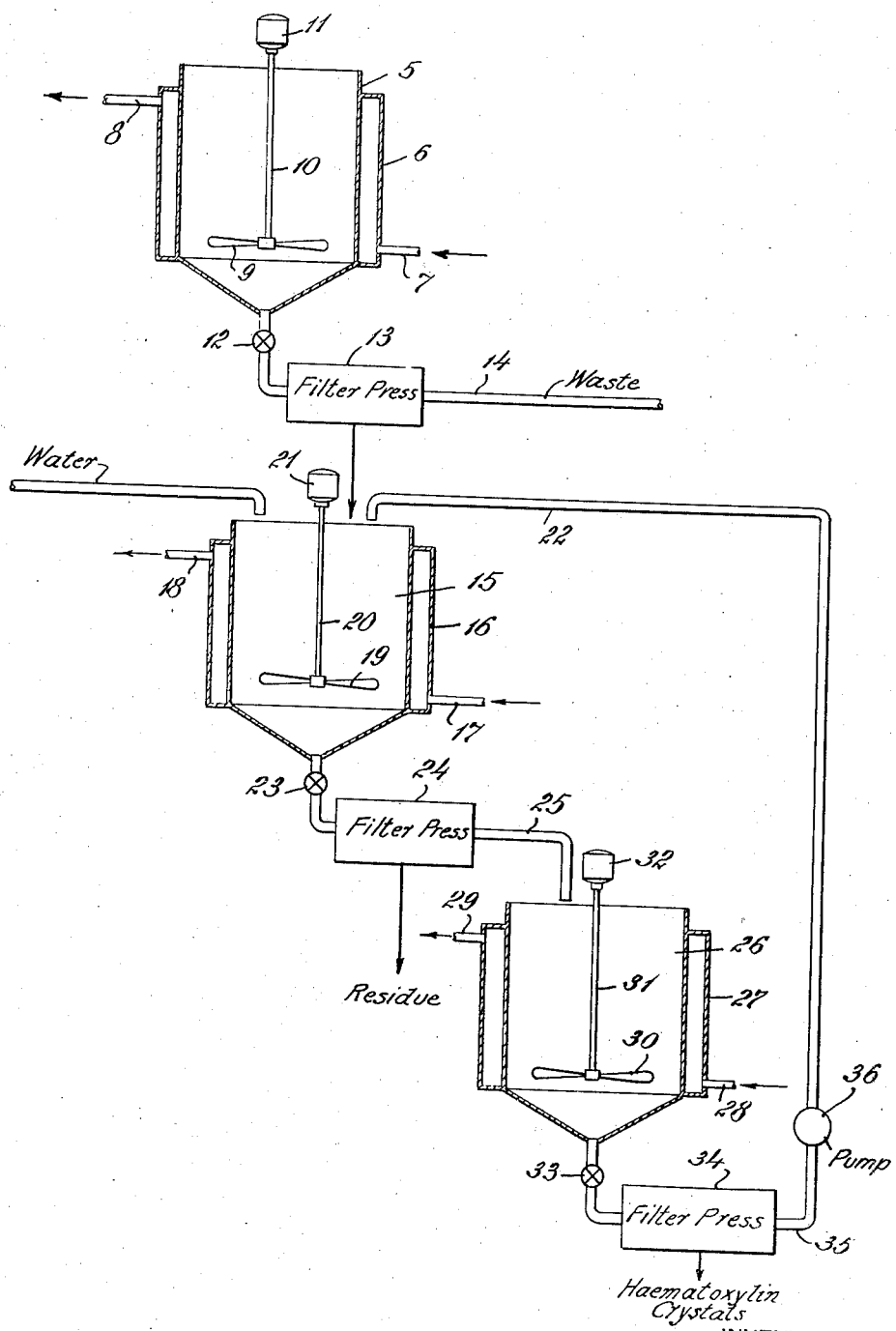
INVENTOR
RAYMOND L. DREW
BY
ATTORNEYS Patented Feb. 13, 1945

2,369,343

UNITED STATES PATENT OFFICE 2,369,343

METHOD OF RECOVERING HEMATOXYLIN

Raymond L. Drew, Arlington, N. J., assignor to American Dyewood Company, New York, N. Y., a corporation of Pennsylvania Application January 19, 1943, Serial No. 472,860

8 Claims. (Cl. 260—333)

This invention relates to the recovery of hematoxylin from aqueous extracts of logwood and particularly to an improved method of effectively separating constituents of such extracts which prevent crystallization of the hematoxylin.

Logwood is extracted by chipping and digesting the chips with water and steam. The extract contains in addition to hematoxylin other water soluble constituents, including glucosides, which act as dispersing agents to peptize the solution, thereby preventing crystallization of the hematoxylin. The recovery of hematoxylin crystals from logwood extracts has been heretofore a tedious and costly operation conducted only on a laboratory scale to produce relatively insignificant quantities of the crystals for use in staining slides for mircoscopic work.

It is the object of the present invention to provide a simple and effective method of recovering hematoxylin crystals at relatively slight cost and in a manner adapted for commercially practicable operations.

Another object of the invention is the removal from the logwood extract of water soluble constituents acting as dispersing agents therein to prevent crystallization of hematoxylin present in the extract.

Other objects and advantages of the invention will be apparent as it is better understood by reference to the following specification and the accompanying drawing, diagrammatically illustrating an apparatus suitable for the practice of the invention.

I have discovered that the effect of glucosides or other water soluble dispersing agents in logwood extract can be overcome by suitably adjusting the pH and temperature of the extract to effect a complete or partial flocculation of the dispersing agents in the extract. When the effect of the disbursing agents is thus reduced or removed, the hematoxylin may be crystallized readily by seeding with hematoxylin crystals and cooling the solution. Agitation is desirable during cooling to ensure the production of smaller and purer crystals. The resulting crystals and the floc may be separated from the mother liquor by filtration. The mother liquor may then be discarded. To facilitate filtration, it may be desirable sometimes, although it is not essential, to add an agent such as "Filter-Cel" or some filter aid.

The filter cake including the hematoxylin crystals and the floc is then treated with water to re-dissolve the hematoxylin, leaving the floc which can be separated by filtration. The liquor containing the dissolved hematoxylin is then recrystallized and the crystals recovered by filtration. Further solution and re-crystallization will improve the purity of the crystals.

The logwood extract is preferably in fairly concentrated form, that is about 40° Tw., and is heated preferably to a temperature of 95° to 100° C. The extract is acidified preferably with hydrochloric acid, though other acids such as sulphuric acid may be used, to a pH in the neighborhood of 1.8. The temperature is maintained for a brief period, for example about one-half hour or until flocculation of the dispersing agent in the solution is substantially effected.

The conditions of operation may be varied. With an extract at about 30° Tw., the preferred pH would be about 1.3. With the extract at 45° Tw., a pH of 2 would be satisfactory. Usually, however, it is not desirable to work with the extract at higher than 40° Tw., because of mechanical difficulties in stirring. When flocculation is effected, the extract is seeded with crystals of hematoxylin and cooled fairly rapidly to about 20° C., preferably with agitation. Crystallization can be completed without agitation, but the crystals will be larger and less pure.

As soon as the crystallization is completed, the mixture of mother liquor, crystals and floc is filtered. The liquor may be delivered to waste. The filter cake is then treated with water, preferably with agitation and heating to dissolve the hematoxylin, thus leaving the floc in suspension. A second filtration removes the floc which may be disposed of as waste. The solution is seeded with crystals of hematoxylin and cooled rapidly to about 20° C. to recrystallize the hematoxylin. The crystals are removed by filtration. The liquor can be returned to dissolve the hematoxylin in the filter cake from the initial operation.

While I prefer to use an apparatus as diagrammatically illustrated in the accompanying drawing, the details are not essential. In place of a plurality of receptacles, each provided with stirring means, the operation may be conducted in a single receptacle to which the material is returned for each successive step. An ordinary filter press may be employed to separate solids from liquids in the several operations, but other well-known devices are equally useful for that purpose.

Referring to the drawing, 5 indicates a receptacle having a jacket 6 to which steam or cooling water may be introduced through a pipe 7, escaping through a pipe 8. Any suitable heating and cooling agent may be employed in the successive steps of the operation. An agitator 9 is mounted on a shaft 10 and driven from any suitable source of power such as a motor 11. In the receptacle 5, the logwood extract is, as previously described, first heated to the desired temperature and acidified to the proper pH. As the result of acidification, the dispersing agent in the extract becomes flocculated. Stirring by means of the agitator 9 is utilized preferably after the extract has been seeded with hematoxylin crystals and during the period while it is being cooled to effect crystallization of the hematoxylin. When crystallization is completed, a valve 12 is opened and the mass is delivered to a filter press 13. The mother liquor escapes through a pipe 14 while the floc and crystallized hematoxylin is retained by the press. The filter cake is withdrawn and delivered to a second receptacle 15 having a jacket 16 supplied with steam or other heating agent through a pipe 17. The heating agent escapes through a pipe 18. An agitator 19 is supported on a shaft 20 and adapted to be driven from a suitable source of power such as a motor 21. Water, or preferably liquor from a subsequent operation, is introduced through a pipe 22 to dissolve the hematoxylin crystals in the receptacle 15, leaving the floc in suspension. A valve 23 is then opened to deliver the material to a filter press 24 which separates the floc from the liquor escaping through a pipe 25. The filter cake, consisting of the floc, may be discarded.

The pipe 25 delivers the solution containing the dissolved hematoxylin to a receptacle 26 having a jacket 27 adapted to be supplied with cooling water through a pipe 28. The water escapes through a pipe 29. An agitator 30 is supported on a shaft 31 and adapted to be driven from any suitable source of power such as a motor 32. In the receptacle 23 the solution of hematoxylin is seeded with hematoxylin crystals and is cooled preferably with agitation. When crystallization is complete, a valve 33 is opened to deliver the material to a filter press 34 where the crystals are separated from the liquor. The liquor is delivered to a pipe 35 and pump 36 which returns it through the pipe 22 to the receptacle 15. Solution of the hematoxylin crystals and re-crystallization thereof will improve the purity of the crystals.

The procedure as hereinbefore described avoids the complicated laboratory methods which were heretofore the procedures followed in securing hematoxylin crystals. As hereinbefore indicated, while apparatus such as that illustrated is preferable for large scale operations, all of the necessary steps can be carried on in the receptacle 5 and the filter press 13 or some equivalent separating device. By following the procedure described, hematoxylin crystals can be recovered cheaply and effectively from logwood extract.

Various changes may be made in the procedure and apparatus without departing from the invention or sacrificing the advantages thereof.

I claim:

1. The method of recovering hematoxylin from aqueous logwood extract which comprises acidifying the extract to flocculate the dispersing agents therein, crystallizing the hematoxylin, separating the floc and the crystasl from the mother liuqor, re-dissolving the hematoxylin crystals in water, and separating the floc from the solution.

2. The method of recovering hematoxylin from aqueous logwood extract which comprises acidifying the extract to flocculate the dispersing agents therein, crystallizing the hematoxylin, separating the floc and the crystals from the mother liquor, re-dissolving the hematoxylin crystals in water, separating the floc from the solution, and re-crystallizing the hematoxylin from the solution.

3. The method of recovering hematoxylin from aqueous logwood extract which comprises heating the extract and adjusting the pH to approximately between 1.3 and 2, thereby flocculating the dispersing agents therein, crystallizing the hematoxylin, separating the floc and the crystals from the mother liquor, re-dissolving the hematoxylin crystals in water, and separating the floc from the solution.

4. The method of recovering hematoxylin from aqueous logwood extract which comprises heating the extract to approximately 95° to 100° C. and adjusting the pH to approximately between 1.3 and 2, thereby flocculating the dispersing agents therein, crystallizing the hematoxylin, separating the floc and the crystals from the mother liquor, re-dissolving the hematoxylin crystals in water, and separating the floc from the solution.

5. The method of recovering hematoxylin from aqueous logwood extract which comprises heating the extract and adjusting the pH to approximately between 1.3 and 2 thereby flocculating the dispersing agents therein, crystallizing the hematoxylin, separating the floc and the crystals from the mother liquor, re-dissolving the hematoxylin crystals in water, and separating the floc from the solution.

6. The method of recovering hematoxylin from aqueous logwood extract which comprises heating the extract and adjusting the pH to approximately between 1.3 and 2 thereby flocculating the dispersing agents therein, crystallizing the hematoxylin, separating the floc and the crystals from the mother liquor, re-dissolving the hematoxylin crystals in water, separating the floc from the solution, and re-crystallizing the hematoxylin from the solution.

7. The method of recovering hematoxylin from aqueous logwood extract which comprises heating the extract to approximately 95° to 100° C., and adjusting the pH to approximately between 1.3 and 2 thereby flocculating the dispersing agents therein, crystallizing the hematoxylin, separating the floc and the crystals from the mother liquor, re-dissolving the hematoxylin crystals in water, separating the floc from the solution, and re-crystallizing the hematoxylin from the solution.

8. The method of recovering hematoxylin from aqueous logwood extract which comprises heating the extract and adjusting the pH to approximately between 1.3 and 2 with hydrochloric acid thereby flocculating the dispersing agents therein, crystallizing the hematoxylin, separating the floc and the crystals from the mother liquor, re-dissolving the hematoxylin crystals in water, separating the floc from the solution, and re-crystallizing the hematoxylin from the solution.

RAYMOND L. DREW.

CERTIFICATE OF CORRECTION.

Patent No. 2,369,343.  February 13, 1945.

RAYMOND L. DREW.

It is hereby certified that error appears in the printed specification of the above numbered patent requiring correction as follows: Page 1, second column, line 4, beginning with "The logwood extract" strike out all to and including the word and period "effected." in line 13, and insert instead the following -

--The logwood extract is preferably in fairly concentrated form, that is about 40° Tw., and is heated preferably to a temperature of 95° to 100° C. The extract is acidified preferably with hydrochloric acid, though other acids such as sulphuric acid may be used, to a pH in the neighborhood of 1.8. The temperature is maintained for a brief period, for example about one-half hour or until flocculation of the dispersing agent in the solution is substantially effected.--;

and that the said Letters Patent should be read with this correction therein that the same may conform to the record of the case in the Patent Office.

Signed and sealed this 5th day of June, A. D. 1945.

Leslie Frazer (Seal) Acting Commissioner of Patents.